United States Patent Office 3,104,497
Patented Sept. 24, 1963

3,104,497
METHOD OF TREATING GRAPE VINES
Clarence J. Speas, Clinton, and Paul L. Andrews, Oak Ridge, Tenn., assignors to Oak Ridge Atom Industries, Inc., a corporation of Tennessee
No Drawing. Filed Aug. 25, 1961, Ser. No. 133,809
7 Claims. (Cl. 47—1.3)

This invention relates to the treatment of grape vines having diploid cells.

In the past it has been proposed to change the chromosome number in plants of various types of treatments involving colchicine, radiation and temperature shock. While such treatments have shown the possibility of producing tetraploid cells in plants which are normally diploid, the results have not been consistent or dependable and the percentages of tetraploids produced have been extremely low.

After appreciable research pertaining to the present invention, it has been found that treatment of grape vines having diploid cells, exemplified by the varieties known as American, California (*Vitis vinifera*), and Muscadine (*Vitis rotundifolia*), in a manner to produce tetraploid cells, will result in larger fruit, thicker leaves, greater vigor, increased yields, and other characteristics such as the leaf shape and maturity time will be changed.

Whereas this invention contemplates irradiation with gamma rays, mere irradiation in an uncontrolled fashion will not suffice to achieve the results contemplated. The rate of the radiation must be between 50 and 100 roentgens per minute and the total dosage must be between 2200 and 2400 roentgens. Moreover, the buds of the vines subjected to such radiation must be in a condition in which appreciable swelling has occurred but in which there has been no appreciable growth.

The vines to be treated are preferably selected from healthy, one year old, rooted plants having at least three canes extending from the main trunk. About forty days prior to the time scheduled for the actual radiation, it has been found to be highly beneficial to saturate the soil about the vines with a 3–10–6 fertilizer dissolved in water to the concentration recommended by the manufacturer, and then repeat this fertilization at ten day intervals until the time for irradiation arrives. About ten days prior to irradiation, if the swelling of the buds has not begun naturally, the vines are subjected to conditions, such as increased temperature, that will promote such swelling so that the buds will be swollen appreciably at the time they are exposed to the gamma rays. The swelling of the buds can be promoted in several ways, including the use of plastic covers and removal of the plants to a greenhouse. In the event that any of the buds advances beyond the swollen condition to a point where actual growth begins, it is preferable to prune the vine to remove all those buds from which such growth has developed.

With their buds thus swollen, the vines are exposed to gamma rays produced by cobalt-60 or cesium-137 and irradiated at a rate between 50 and 100 roentgens per minute until the dosage is between 2200 and 2400 roentgens, an optimum dose being 2300 roentgens.

It has been found that not all of the buds of these vines will develop equally during the portion of the treatment prior to irradiation, and consequently not all of them will produce tetraploid growth. However, as soon as the growth progresses to a stage at which the leaf shape becomes evident, those buds producing diploid growth will be recognized and removed.

As result of the method of this invention, 95% of the plants treated have produced tetraploid growth and a very high percentage of the buds of each cane have been tetraploid in character.

We claim:
1. A method of treating grape vines bearing buds and having diploid cells comprising subjecting said vines to conditions promoting the swelling of said buds, and then irradiating the swollen buds with gamma rays at a rate between 50 and 100 roentgens per minute until the dosage is between 2200 and 2400 roentgens.
2. A method according to claim 1 wherein the vines are selected from the group consisting of American, California and Muscadine grapes.
3. A method according to claim 1 wherein the irradiation is effected with cobalt-60.
4. A method according to claim 1 wherein the irradiation is effected with cesium-137.
5. A method according to claim 1 wherein said vines are treated with fertilizer at least ten days prior to irradiation.
6. A method according to claim 1 wherein said vines are treated with fertilizer periodically beginning at least ten days prior to irradiation.
7. A method according to claim 1 wherein said vines are treated with a fertilizer solution at approximately ten day intervals prior to irradiation.

References Cited in the file of this patent
UNITED STATES PATENTS
2,830,190    Karp ------------------ Apr. 8, 1958

OTHER REFERENCES

Nuclear Science Abstracts, vol. 14, page 1915, Abstract 15157, published August 15, 1960, article, "A Standard Source of Radiation . . ."

Lamarque et al.: "Physiological and Genetic Effects of Ionizing Radiation on Some Plants." Pages 275–281 in vol. 27 of Proceedings of Second International Conference on Peaceful Uses of Atomic Energy, pub. by United Nations (Geneva, Switzerland) 1958.

"Handbook on Breeding Ornamental Plants," pub. Aug. 1959 by Brooklyn Botanic Garden (Brooklyn 25, N.Y.) as a special printing of Plants and Gardens (Magazine) vol. 15, No. 2 pages 98–100, article, "Radiation Genetics and Crop Improvement" by Singleton et al.